United States Patent
Diamond et al.

[11] 3,903,614
[45] Sept. 9, 1975

[54] APPARATUS FOR SIMULATING AIRCRAFT CONTROL LOADING

[75] Inventors: John A. Diamond, Binghamton; Amedeo A. Sylvester, Endicott; Fred F. Carver, Chenango Forks, all of N.Y.

[73] Assignee: The Singer Company, New York, N.Y.

[22] Filed: Mar. 27, 1970

[21] Appl. No.: 23,153

[52] U.S. Cl. ............................................. 35/12 S
[51] Int. Cl.[2] ........................................... G09B 9/08
[58] Field of Search ...... 35/12 S; 244/83 D; 200/47; 74/506

[56] References Cited
UNITED STATES PATENTS

| | | | |
|---|---|---|---|
| 2,522,278 | 9/1950 | Koertge et al. | 200/47 |
| 2,851,795 | 9/1958 | Sherman | 35/12 S |
| 3,363,881 | 1/1968 | Kobelt | 74/506 X |
| 3,496,651 | 2/1970 | Briguglio et al. | 35/12 S |
| 3,517,446 | 6/1970 | Corlyon et al. | 35/12 S |
| 3,569,640 | 3/1971 | Suntheimer | 200/47 |

*Primary Examiner*—Wm. H. Grieb
*Attorney, Agent, or Firm*—James C. Kesterson; Jeffrey Rothenberg

[57] ABSTRACT

An electro-mechanical system for providing an opposing force to movement of a simulated control member in a grounded flight trainer. The invention utilizes an electric motor connected to the control member by a flexible element which, in the disclosed embodiment, comprises a continuous cable with a predetermined amount of slack. This allows some degree of differential movement between the control member and motor, to which a pair of position potentiometers are respectively connected, thereby converting the differential position to an electrical signal which is used, together with other factors, to control movement of the motor.

8 Claims, 4 Drawing Figures

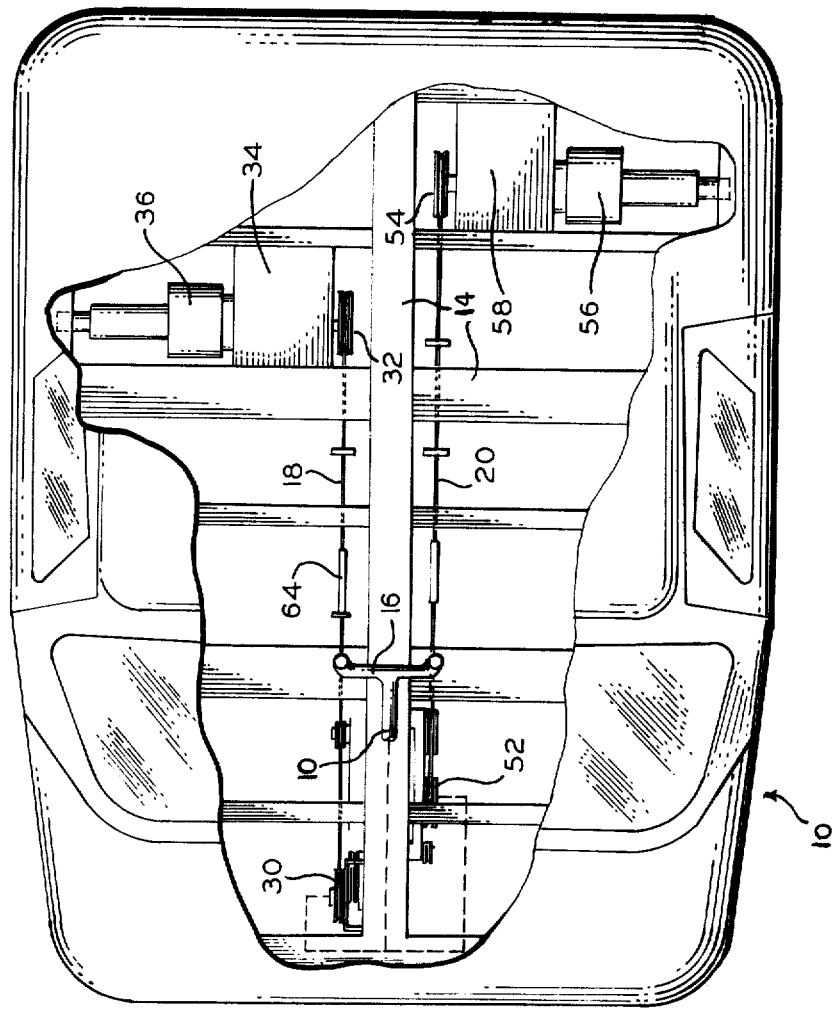

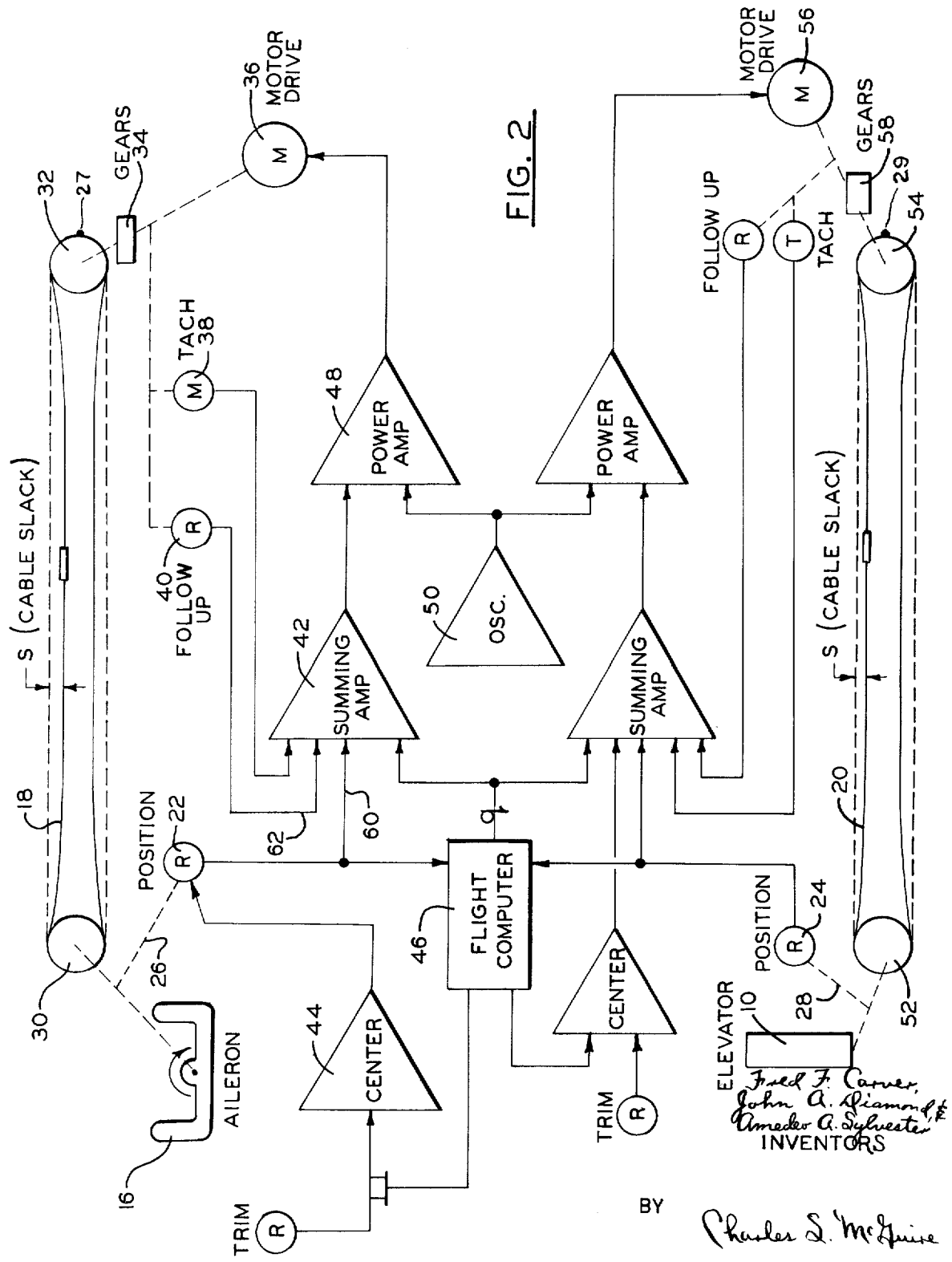

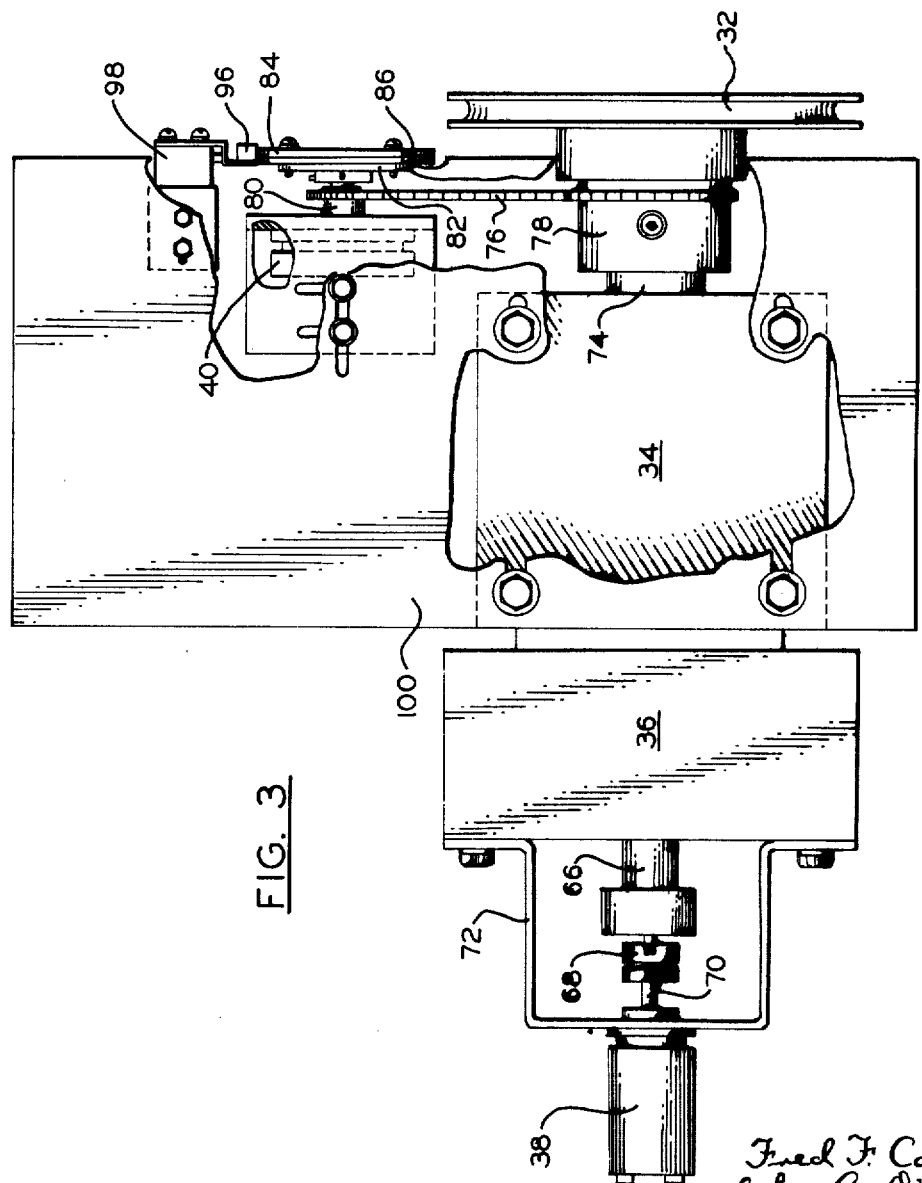

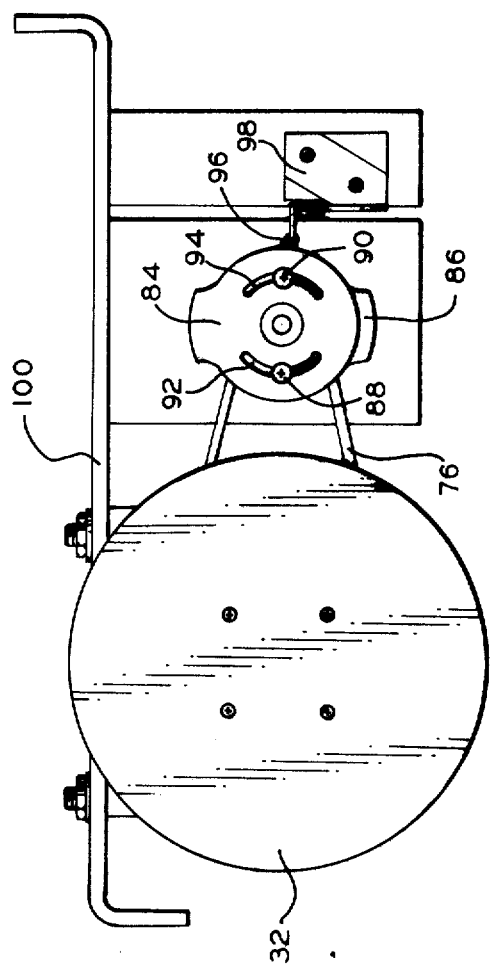

APPARATUS FOR SIMULATING AIRCRAFT CONTROL LOADING

The present invention relates to fixed-base aviation trainers and, more specifically, to improved means for providing a realistic feel to the simulated controls of such trainers.

In order to be of optimum value in familiarizing student pilots with the operation of actual aircraft, the movable, simulated control members of fixed-base trainers and simulators must react to applied forces in a manner as closely identical to actual aircraft controls as possible. Conventional types of control loading systems, i.e., means providing a force on the control member opposing the force applied by the student, include hydraulic, pneumatic, mechanical and electrical means, and various combinations thereof, for providing the opposing force. Various advantages and disadvantages have, in general, been associated with the various means for providing the loading force and the type used in a particular application is usually based on the dictates of economy, degree of realism required, etc.

It is common in a great many applications to derive and use an electrical signal to control the action of the force-opposing means, whether the latter be hydraulic, electric or mechanical. The magnitude and phase of the signal may be influenced by inputs representing the simulated dynamic air pressure on the control surfaces, and other simulated flight conditions, as well as the instantaneous position of and force applied to the control member by the student pilot. For this purpose, position follow-up devices such as rotary potentiometers are provided to indicate electrically the position of the control member and the position of the force-opposing device.

In the disclosed embodiment of the present invention an electric motor is used to provide a force which opposes the force applied manually to the control member. The electrical signal applied to the winding of the motor is dependent upon, among other things, the difference in position between a potentiometer connected for movement directly by the control member and a second potentiometer connected for movement with the motor. If a rigid connection is provided between the control member and the motor, there will be no differential movement between the two, of course, and no signal indicating a difference will be generated. Thus, some provision must be made for allowing a certain degree of motion differential between the control member and the force-opposing means. In the present invention this is efficiently and simply accomplished by providing a predetermined amount of slack in a loop cable which connects the control member to the motor.

It is a principal object of the invention to provide a relatively simple and inexpensive means for developing a controlled difference or error signal in a position servo system used for control loading in a fixed-base aircraft trainer.

A further object is to provide improved means for mechanically connecting a simulated control member to means providing a force opposing manual forces applied to the control member in a manner allowing a certain amount of differential motion.

Still another object is to provide control loading apparatus for a fixed-base flight trainer which utilizes mechanical elements identical to those in an actual aircraft with provision for generating a control signal for the force-opposing means through proper adjustment of such identical elements.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a plan view of a typical flight trainer with portions broken away to show the incorporation therein of one embodiment of the invention;

FIG. 2 is a schematic diagram showing the interconnection of various mechanical and electrical elements of the control loading system;

FIG. 3 is a side elevational view of a portion of the apparatus as seen along the line 3—3 of FIG. 1; and FIG. 4 is an end view of the apparatus of FIG. 3.

The control loading system of the present invention may be incorporated with any of the control members, such as rudder, aileron and elevator, normally provided on a conventional fixed-base flight trainer, as will be readily understood by those skilled in the art. In the illustrated embodiment, the usual control column 10 is shown installed in a typical flight trainer cockpit 12. The elements of the trainer, including cockpit 12, are mounted on a suitable, rigid framework 14 comprising a plurality of rigidly connected structural members. Manually engagable wheel 16 is affixed to the end of control column 10 for manipulation by a student pilot in exactly the same manner as the wheel of a conventional light aircraft. In fact, actual aircraft parts may be, and commonly are, used in trainers and simulators of this type. Details of construction and mounting of control column 10 are, therefore, shown only schematically in FIG. 1 and not shown or discussed in detail, and will be assumed to be identical to well-known aircraft installations wherein the control column may be rotated to effect aileron movement, resulting in aircraft roll, and moved axially to effect elevator movement, resulting in aircraft pitch.

It is also conventional to connect the control column to the afore-mentioned control surfaces by means of cables passing around appropriate pulleys, or the like, mechanically connected to the control surface. Cables are likewise employed in the present system and pass around pulleys connected to the apparatus providing the opposing force, described later in more detail. Cable 18 is connected for movement in response to rotation of wheel 16, and thereby control column 10, and cable 20 is connected for movement in response to axial movement of the control column. Conventional rotary potentiometers 22 and 24 are mechanically connected directly to control column 10 by means schematically indicated in FIG. 2 by dotted lines 26 and 28, respectively. The electrical signals developed in dependence on the movement of potentiometers 22 and 24 are commensurate with the rotational and axial positions, respectively, of control column 10.

For simplicity of illustration, cables 18 and 20 are shown somewhat schematically in FIG. 2, each passing around a pair of wheels or pulleys. In order to prevent any slippage of the cable on the pulleys, positive attachment means are provided such as conventional ball locks indicated schematically at 27 and 29. Cable 18 passes around pulley 30, connected for rotation by wheel 16, and around pulley 32, connected to the output shaft of suitable reduction gearing 34 which, in turn, is directly coupled to motor 36. Also connected for common rotation with the motor shaft are tachometer generator 38, a DC voltage generator providing electrical signals commensurate with velocity, and position follow-up potentiometer 40, providing electrical signals commensurate with the rotational position of motor 36. These signals are applied to summing amplifier 42 along with the signal from potentiometer 22, a signal from amplifier 44 representing the tendency of the controls to return to the center or neutral position due to the effects of trim, and a signal from flight computer 46 representing simulated dynamic air pressure (conventionally represented by the letter $q$) on the control surfaces. The control signal, represented by the output of summing amplifier 42 is applied to motor 36 through power amplifier 48, along with a dither voltage supplied by oscillator 50. The latter is a conventional device used to supply a continuous voltage to the motor windings, alternating slightly about a null value in such a manner that the dither voltage does not move the motor, but allows inertia thereof to be overcome more easily, thereby increasing the response to control signals from amplifier 42 without large initial current drain.

Elements of the control loading system thus far described are conventional in flight trainers or simulators of the type under consideration. The flight computer, amplifiers, position and velocity feedback devices, etc., as well as their general manner of employment in providing a force opposing the manual force applied to the control member, have been previously employed in various well-known configurations, and the design and construction of embodiments suitable for employment with the present invention are well within the capabilities of those skilled in the art. Therefore, further details of these elements need not be described. Likewise, the elements used to provide control loading for axial movement of control column 10 may be identical to those used to provide loading for rotational movement. Such elements are shown in FIG. 2 in cooperative relation to cable 20, pulleys 52 and 54, motor 56 and gear box 58, also seen in FIG. 1, but are not further numbered or described.

The present invention is specifically concerned with the signals supplied to summing amplifier 42 from position potentiometers 22 and 40, through lines 60 and 62, respectively. If the amount of rotation of wheel 16 were identical to rotation of motor 36, the relative positions of potentiometers 22 and 40 would always be the same and there would be no positional difference signal tending to move motor 36 in opposition to movement of the control member. While previous control loading systems have been provided with position servo means allowing differential movement of control member and force-opposing apparatus, such as springs or other resilient elements connecting the two, the present invention provides such differential movement in a construction which may include only conventional aircraft parts. The force-opposing motive means are substituted for the aircraft control surfaces, but all elements of the control column, pulleys and cable may be essentially identical in construction and arrangement to those of an actual aircraft.

The aforementioned differential movement is accomplished according to the invention by providing a predetermined tension in cable 18 which allows a certain degree of slack so that initial movement of wheel 16 may be reflected in tightening the slack rather than rotating pulley 32. Thus, the amount of slack may be represented as "breakaway force," or the force required to set the simulated control surface in motion from an initial position. The precise amount of predetermined tension, or cable slack, will be dependent to some extent on such things as cable length, pulley diameter, and motor size as well as the desired degree of opposing force. A relatively loose cable, for example, enough to provide at least an inch of slack as indicated in FIG. 2 over a distance of about 4 feet between pulleys, has been found desirable in typical applications. Cable tension may be adjusted by any convenient, conventional means such as a turnbuckle, indicated in FIGS. 1 and 2 by the reference numeral 64.

Details of motor 36 and associated elements are shown in more detail in FIGS. 3 and 4. Shaft 66 extends from one side of motor 36 and is directly attached, by appropriate coupling means 68, to shaft 70 of tach generator 38, which is supported on bracket 72 attached to the motor. The output shaft on the other side of motor 36 is connected to gear box 34, containing appropriate reduction gearing (not shown), which in turn has an output shaft 74 upon which pulley 32 is mounted. Chain 76 passes around collar 78 of pulley 32 and around shaft 80 of potentiometer 40, thereby rotating the potentiometer in direct correspondence to rotation of pulley 32 and motor 36. Also coupled to shaft 80 is support 82, upon which rotary cams 84 and 86 are mounted by means of screws 88 and 90 which pass through slots 92 and 94 (FIG. 4), respectively, thereby allowing relative rotational adjustment of the cams. Follower 96 is mounted on an arm connected to a contact of microswitch 98 and rides on the peripheral surfaces of cams 84 and 86. Gear box 34, potentiometer 40 and microswitch 98 are mounted on support plate 100 or on brackets attached thereto. Support plate 100 is fixedly attached to portions of framework 14.

During normal operation of the control loading system, follower 96 rides on the low portions of cams 84 and 86, as shown in FIG. 4, and the contacts of microswitch 98 are closed. Rotation of pulley 32 in either direction to an extent sufficient to cause the high portion of either cam to deflect the follower results in opening the microswitch contacts. Rotation to this extent will occur only in the event of a system malfunction. Microswitch 98 is interposed in the circuit of motor 36, whereby opening of the contacts cuts off power to the motor and prevents further operation until the malfunction is corrected. This protects against both mechanical damage and electrical overload, particularly to power amplifier 48. The safety device is preferable to mechanical limit stops which are also subject to damage or malfunction, for example, if the cable should break or come off the pulleys. Furthermore, the cams can be conveniently mounted for common rotation with potentiometer 40.

We claim:

1. A control loading system including motive means for providing a realistic opposing force to the manual movement of a simulated aircraft control member in a fixed-base flight simulator, said system comprising, in combination:
- a. means for deriving a first electrical signal commensurate with the position of said control member;
- b. means for deriving a second electrical signal commensurate with the position of said motive means;
- c. means for deriving a control signal commensurate with the difference between said first and second signals to drive said motive means;
- d. a flexible non-elastic cable connecting said control member and said motive means for transmission of motion and force from one to the other; and
- e. said cable having a predetermined amount of slack, sufficient to allow differential movement between said control member and said motive means which produces a differential between said first and second electrical signals.

2. The invention according to claim 1 wherein said means for deriving first and second electrical signals comprise position potentiometers connected for direct movement with said control member and said motive means, respectively.

3. The invention according to claim 2 wherein said motive means comprises an electric motor.

4. The invention according to claim 1 wherein said cable passes around a pulley connected for rotation by said motive means and further means are provided to prevent slippage of said cable on said pulley.

5. The invention according to claim 4 wherein said means for deriving said second electrical signals comprises a rotary position potentiometer connected for rotation with said pulley.

6. The invention according to claim 5 wherein safety means are provided for interrupting the supply of power to said motive means in the event of rotation of said pulley beyond predetermined limits.

7. The invention according to claim 6 wherein said safety means comprises a switch having contacts movable between open and closed positions in response to rotation of rotary cam means.

8. The invention according to claim 7 wherein said cam means are affixed to the same shaft as said rotary potentiometer for coaxial rotation therewith.

* * * * *